June 12, 1934.  M. J. DANIELSON ET AL  1,962,894
TAPPING MACHINE
Filed Dec. 6, 1929  3 Sheets-Sheet 1
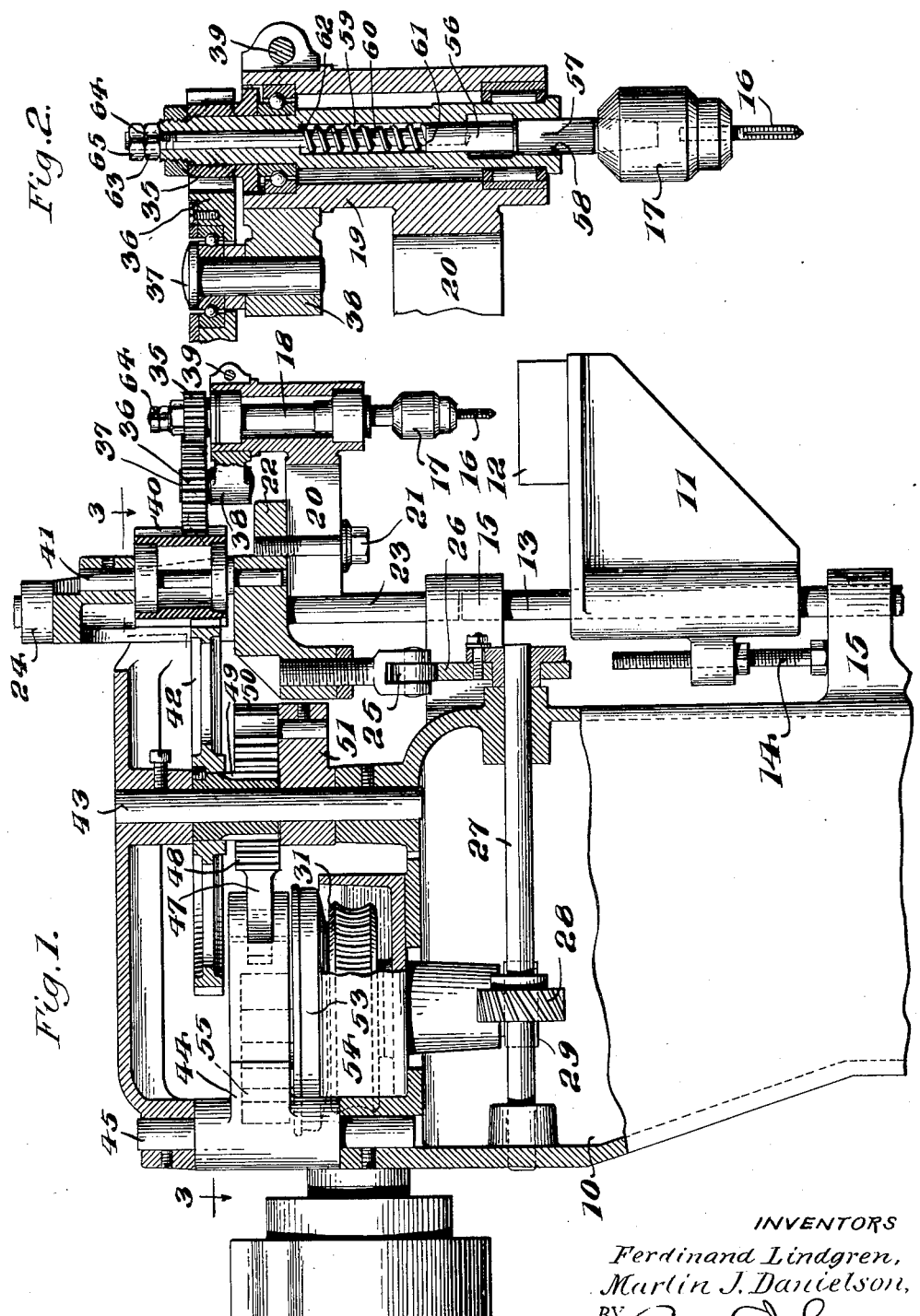
INVENTORS
Ferdinand Lindgren,
Martin J. Danielson,
BY 
ATTORNEY

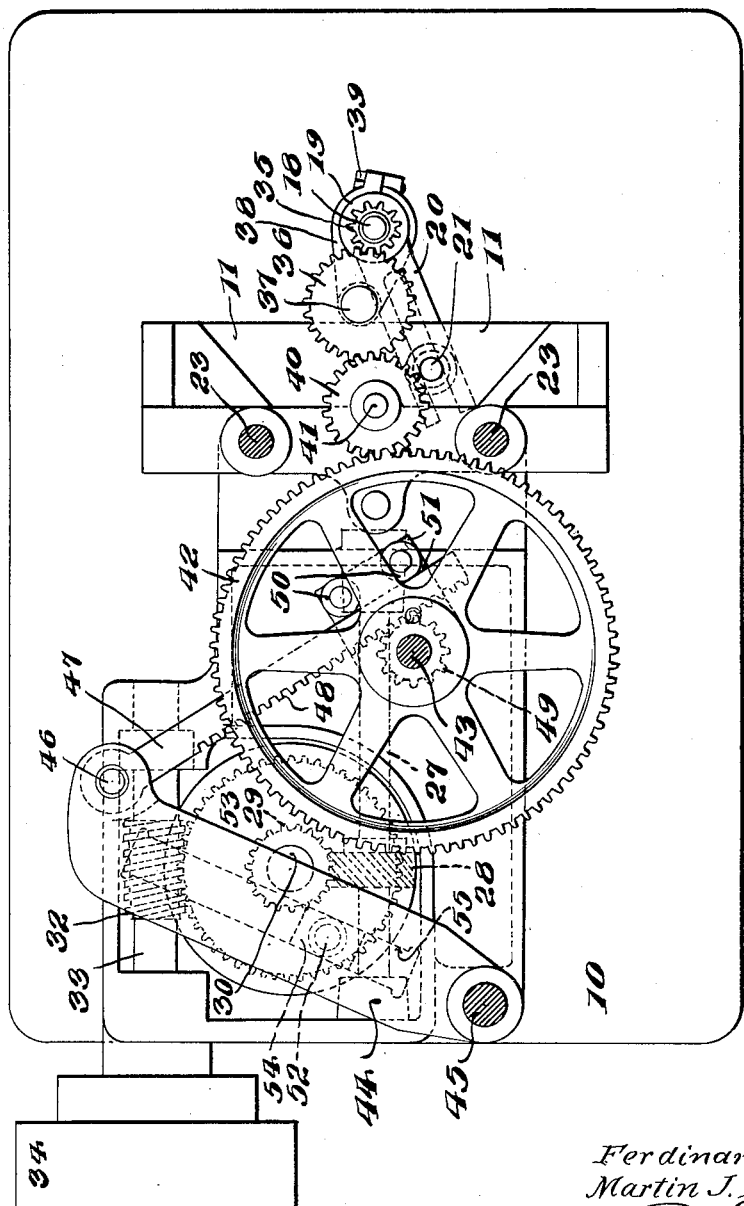

June 12, 1934.   M. J. DANIELSON ET AL   1,962,894
TAPPING MACHINE
Filed Dec. 6, 1929   3 Sheets-Sheet 3
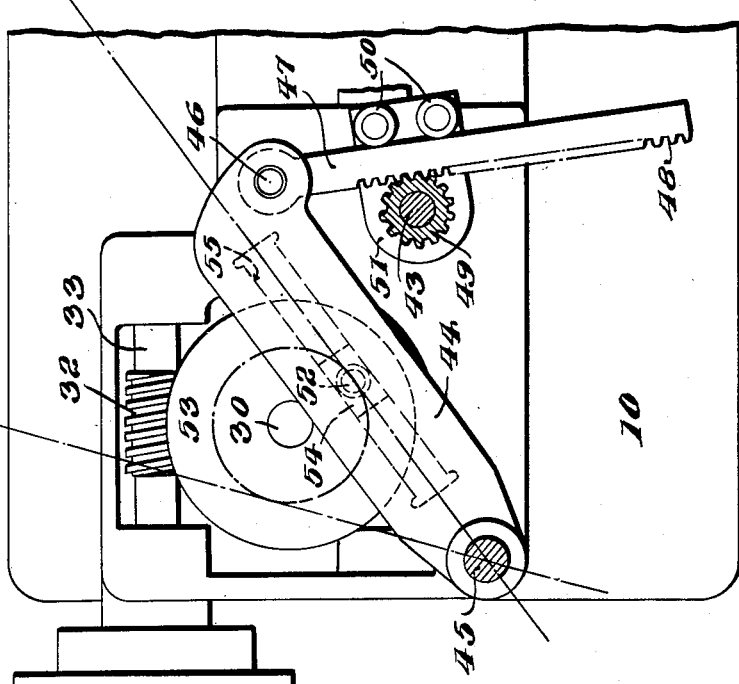
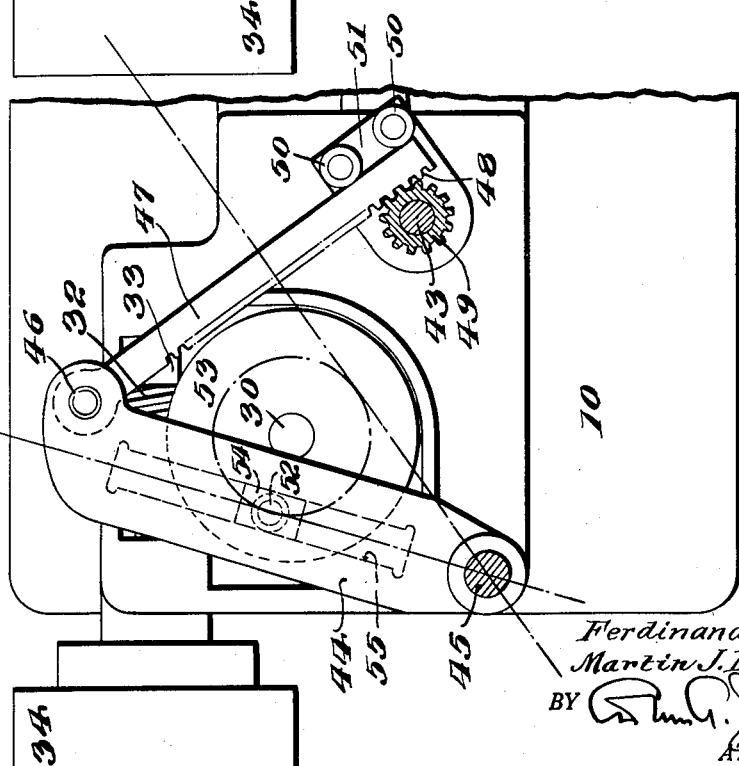
INVENTORS
Ferdinand Lindgren,
Martin J. Danielson,
BY
ATTORNEY Patented June 12, 1934

1,962,894

UNITED STATES PATENT OFFICE 1,962,894

TAPPING MACHINE

Martin J. Danielson and Ferdinand Lindgren, Bridgeport, Conn.

Application December 6, 1929, Serial No. 412,206

11 Claims. (Cl. 10—136)

This invention relates to tapping machines, and more particularly, to such machines which automatically advance and return the tap through the work and control its rotation during the advancing and return movements.

An object of this invention is to provide means for controlling the rotation of the tap in thread-cutting and reverse direction, so that the tap may rotate at the normal thread-cutting speed but return at a greater speed, thereby permitting the production of the machine to be greatly speeded-up and effecting considerable economy in the manufacture of parts being worked upon.

Another object is to provide improved means for mounting the tap so that the tap support and work table may be moved toward each other rapidly and without regard to the pitch of the thread being cut, such means being resilient and being tensioned by this rapid movement so as to cause the tap to advance through the work as the threads are being cut.

And still another object of this invention is to provide means for varying the tension of the spring which impels the tap so that the spring will apply more or less force to the tap according to the size of the thread being cut.

Other objects and advantages will hereinafter appear.

In the accompanying drawings which show one form of the invention, that at present preferred—

Figure 1 is a side view of a tapping machine made in accordance with the present invention, showing parts of the casing and some of the operating parts in section.

Fig. 2 is a vertical sectional view of the tap-supporting mechanism.

Fig. 3 is a horizontal sectional view taken approximately on the line 3—3 of Fig. 1.

Fig. 4 is a detail view showing the tap-rotating mechanism with the parts in the positions they occupy at the beginning of the thread-cutting operation.

Fig. 5 is a similar view, showing the parts in the positions they occupy at the end of the thread-cutting operation and at the beginning of the return or reverse operation.

The tapping machine illustrated herein comprises a suitable or conventional frame work 10 having at its front end an adjustably mounted work-table 11, the top surface of which is adapted to support a workpiece 12 to be tapped. Any suitable work-supporting means may be employed within the scope of this invention and the work may be fed into position to be operated upon by a dial, a turret, or a conveyer, the table 11 merely being shown to explain the invention. The table is slidably mounted on vertical rods 13 and its position may be adjusted by a screw 14 whose end abuts against the lower one of two lugs 15 on the frame supporting the guide rods 13.

The tap 16 which is to cut screw-threads in the workpiece 12 is illustrated as mounted in a chuck 17 driven by a spindle 18 rotatably mounted in a housing 19 in an arm 20 adjustably secured by bolts 21 to a slide or carriage 22 mounted for vertical movement on guide rods 23 supported by the upper lug 15 and a cross arm 24 of the frame work. This adjustable connection between the arm 20 and the carriage 22 permits the tap 16 to be positioned correctly backwardly and forwardly with relation to the work.

According to the present invention, either the workpiece 12 may move toward the tap 16 or the tap 16 may move toward the workpiece, or both may move toward each other. It is immaterial, so far as the present invention is concerned, which mode of operation is employed. In the machine shown herein, however, the tool is reciprocated, that is, it is moved in advancing and returning directions with relation to the work, and for this purpose the carriage 22 is freely slidable on the guide rods 23 and has a roller 25 resting on a feed-controlling cam 26 mounted on a shaft 27 journalled in the frame work and provided with a helical gear 28 driven by a cooperating helical gear 29 on a vertical shaft 30, which, in turn, has a worm wheel 31 driven by a worm 32 on a main driving shaft 33. The latter has at its ends a pulley 34 which is driven by an intermittent driving mechanism not shown and adapted to cause the main driving shaft 33 to rotate the vertical shaft 30 and horizontal cam shaft 29 one revolution for each operation thereof, so that for each revolution of the shaft 27 the carriage 22 is allowed to descend by gravity and is subsequently positively raised by the cam 26.

The spindle 18 is provided at its upper end with a gear 35 meshing with an intermediate gear 36 carried by a stud 37 in a bracket 38 adjustably mounted on the housing 19 of the spindle and adapted to be secured in adjusted position by a bolt 39. This intermediate gear 36 is adapted to couple the gear 35 on the spindle with a pinion 40 mounted on a shaft 41 carried by the carriage 22 and adapted to mesh with a driving gear 42 mounted on a vertical shaft 43 carried by the frame 10.

The pinion 40 is made sufficiently wide to maintain its driving relation with the relatively fixed gear 42 during the reciprocatory movements of the carriage on which the pinion is mounted, so as to transmit motion from the gear 42 to the intermediate gear 36 and spindle gear 35 while the spindle carriage is descending or ascending.

Heretofore, the spindle gear and its driving train were rotated at constant speed first in cutting direction and then in reverse direction, while the tap and work were being brought toward each other and returned, and hence it required just as much time to tap the hole in the work as it did to withdraw the tap from the tap hole, although there appears to be no need of doing so.

According to the present invention, however, the tap spindle and its driving train are rotated at different angular speeds during the cutting of the thread and the removal of the tap from the threaded hole, the angular speed for rotating the tap in thread-cutting direction being that dictated by sound machine practice, while the angular speed of the reverse rotation of the tap to withdraw the tap from the tap hole is much greater. Thus, according to this invention, less time is required to remove the tap from the work than heretofore, permitting greater production to be obtained from the machine and reducing the cost of manufacture of the parts worked upon.

To accomplish this, the present invention provides a variable driving connection between the main drive shaft 33 and the spindle gear 35. Actually, in the form of the invention shown herein, this variable driving connection is provided between the vertical shaft 30 which carries the worm wheel 31 and the driving gear 42 which meshes with the pinion 40 on the carriage. This variable driving connection not only varies the angular speed at which the spindle driving train is rotated but also varies the direction of rotation, and hence a single means is provided by the present invention for these dual functions.

In the specific form of the invention herein illustrated as exemplary thereof, the variable driving connection comprises an oscillatory arm 44 pivotally mounted on the frame 10 at 45 and having at its free end a pivotal connection 46 with a bar 47 having rack teeth 48 adapted to engage with a pinion 49 secured to the driving gear 42. The bar 47 is held with the rack teeth 48 in mesh with the pinion 49 by a pair of rollers 50 engaging the rear edge of the rack and carried by an arm 51 freely mounted to rotate on the vertical shaft 43 so as to shift its position with the shifting movements of the rack when the rack is reciprocated by the oscillation of the arm 44.

The arm 44 is oscillated by means of a pin 52 carried by a disk 53 secured to the vertical shaft 30 and moving coordinately with the worm wheel 31. The pin carries a shoe 54 riding in a longitudinal slot 55 in the oscillatory arm 44.

Hence, as the disk 53 rotates, the pin 52 through the shoe 54 rocks the arm 44 first in one direction and then in the other, thus causing the rack bar 47 to reciprocate in the space between the rollers 50 and the pinion 48 and thus drive the pinion, a portion of the revolution of the disk 53 causing the pin 52 to move the arm 44 and rack bar 47 in one direction and the other portion of the revolution causing these parts to move in the reverse direction. This causes the driving gear 42 to first rotate forwardly and then backwardly, and with it the other parts of the spindle driving train including the spindle 18 and tap 16. Hence, it will be seen that for each rotation of the disk 53 the spindle is rotated first in one direction and then in the other.

In order that the driving train and the spindle may be rotated at substantially different angular speeds in thread-cutting and tap-withdrawing directions, the arm 44 is so arranged that the crank pin 52 is substantially closer to the pivotal mounting 45 of the arm 44 through a portion of the rotation of the disk 53 than through the remaining portion of the rotation. In other words, the parts are arranged so that the crank pin relatively closely approaches the pivotal mounting 45 of the arm during a portion of the rotation of the disk 53 carrying the crank pin 52. With this arrangement, less angular movement of the operating shaft 30 and the disk 53 is required to return the oscillating arm 44 than is required to drive it forwardly, and hence the return operation takes place in a shorter time interval, the shaft 30 being rotated at a constant speed. This action is illustrated in Figs. 4 and 5.

In Fig. 4, the oscillating arm 44 is in its rearward position and the machine is ready to begin the thread-cutting operation which takes place during practically 220° of rotation of the driving shaft 30 (the spindle 18 and tap 16 being rotated in thread-cutting direction) or until the oscillating arm 44 reaches the position shown in Fig. 5. In this position, the slot 55 in the arm is tangential to the circle described by the crank-pin 52. The continued rotation of the crank pin will accordingly cause the arm 44 to be returned to the position shown in Fig. 4 when the slot 55 will again be tangential to the crank-pin's circle of travel. It will be noted that only 140° of movement of the driving shaft 30 and crank pin 52 is required to do this.

Since the speed of the operation of the machine is arranged so that the 220° of rotation of the driving shaft 30 will allow sufficient time for the proper cutting of the material worked upon, it will be noted that the time saved by the quick return of the spindle greatly speeds up the operation of the machine and increases its production. It should be understood, of course, that the radial distance of the crank pin 52 from the axis of the shaft 30 and the distance from the latter to the pivotal mounting 45 of the oscillatory arm 44 may be other than that shown, i. e. more or less, and that with any such changes the ratio between the thread-cutting speed and tap-withdrawing speed will be varied. The proportions given and shown are merely to illustrate and explain the invention.

As above stated, the tap is moved toward the work as a result of gravity, the cam 26 merely allowing the carriage 22 to descend. According to the present invention, however, the weight of the carriage and the parts mounted thereon does not determine the pressure or force with which the tap is caused to engage the work, but power for this purpose is stored in the machine.

For this purpose, the chuck 17 is not mounted directly on the spindle 18, but, as shown in Fig. 2, is mounted on a compensator rod 56 slidably mounted with relation to the spindle and having a non-circular portion 57 in engagement with the correspondingly shaped portions of the lower end 58 of the spindle. Located in a chamber 59 in the spindle and surrounding a reduced portion of the rod 56 is a spring 60 having one end in engagement with a shoulder 61 on the rod and the other end in engagement with the end wall 62 of the chamber 59. Thus, when the carriage 22 descends under its own weight, the tap 16 will be brought into engagement with the work and, meeting with the resistance of cutting the thread, might not descend so rapidly as the carriage. If it does not, the spring 60 will be compressed and will store power which is subsequently used as the tap proceeds through the hole being threaded.

After the thread has been cut and as the carriage 22 is being raised by the cam 26 while the tap is being rotated in reverse or tap-withdrawing direction, the spring 60 continues to press the tap down on the work and this holds the work to the table without the need of a stripper or other device for insuring the retention of the workpiece while the tap is being raised. The parts are so timed in their movements that the tap will be out of the threaded hole before the carriage has been raised far enough to allow the spring 60 to reach the limit of its movement.

The limit of movement of the spring and spindle and rod 56 relative to the spindle is determined by a check-nut 63 located at the threaded upper end 64 of the rod which passes through the upper end of the spindle and which has a lock-nut 65. By proper adjustment of the check-nut 63, the spindle may be drawn up or let down, thereby varying the initial tension of the spring 60 to that degree of tension desired.

It should be noted particularly that the extension of the rod 56 through the spindle and the check-nut 63 provided on the extension holds the chuck 17 and rod 56 from falling out of the spindle.

Variations and modifications may be made within the scope of this invention and portions of the improvements may be used without others.

Having thus described the invention, what is claimed as new and for which it is desired to obtain Letters-Patent, is:—

1. In a tapping machine, a main frame; a driving shaft; a tap spindle; a work support; means for automatically producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter including a gear train, an oscillating arm, one main pivot for said oscillating arm on the main frame, a crank pin, and a rack engaging said gear train and having a pivotal connection with the oscillating arm for causing the tap spindle to rotate in one direction during the thread-cutting relative movement between the tap and the work and to rotate in the reverse direction during tap-withdrawing relative movement between the tap and work.

2. In a tapping machine, a driving shaft; a tap spindle; a work support; means for automatically producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter including a gear train, an oscillating arm, a stationary pivot for the oscillating arm, a crank pin driven by the driving shaft and associated with said oscillating arm, and a rack engaging said gear train and having a pivotal connection with the oscillating arm for causing the tap spindle to rotate at one angular speed and in one direction during thread-cutting relative movement between the tap and work and to rotate at another and greater angular speed and in the reverse direction during tap-withdrawing relative movement between the tap and work.

3. In a tapping machine, a uni-directional driving shaft; a tap spindle; a work support; a carriage for the tap spindle adapted to be moved toward and from the work support means actuated by the uni-directional driving shaft for producing relative movement between the tap spindle carriage and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter and including permanently engaged members for causing the tap spindle to rotate at one angular speed and in one direction during the thread-cutting relative movement between the tap spindle carriage and work and to rotate at another and greater angular speed in the reverse direction during tap spindle carriage withdrawing movement relative to the work.

4. In a tapping machine, a uni-directional driving shaft; a tap spindle; a work support; a carriage for the tap spindle adapted to be moved toward and from the work support means having a direct mechanical connection with the uni-directional drive shaft for producing relative movement between the tap spindle carriage and work support toward and from each other to cause the work carried by the latter to be entered by a tap carried by the spindle to cut threads in the work, and to cause the tap to be withdrawn from the work, respectively; and driving connections between the uni-directional driving shaft and tap spindle for rotating the latter and including means operated coordinately with said means for producing relative movement between the tap spindle carriage and the work support for causing the tap spindle to rotate at one angular speed and in one direction during thread-cutting relative movement between the tap and the work and to rotate at another and gradually increasing greater angular speed and in reverse direction during tap-withdrawing relative movement between the tap spindle carriage and the work.

5. In a tapping machine, a uni-directional driving shaft; a tap spindle; a work support; a carriage for the tap spindle adapted to be moved toward and from the work support means for producing relative movement between the tap spindle and work support toward and from each other to cause the work carried by the latter to be entered by a tap carried by the spindle to cut threads in the work, and to cause the tap to be withdrawn from the work, respectively; and driving connections between the uni-directional driving shaft and tap spindle for rotating the latter and including permanently engaged members operated coordinately with said means for producing relative movement between the tap spindle carriage and the work support for causing the tap spindle to rotate at one angular speed and in one direction during thread-cutting relative movement between the tap and the work and to rotate at another and greater angular speed and in reverse direction during tap-withdrawing relative movement between the tap spindle carriage and the work.

6. In a tapping machine, a driving shaft; a tap spindle; a work support; means for producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter including a gear train, an oscillating arm having a fixed pivot point, and a rack engaging said gear train and connected to said oscillating arm for causing the tap spindle to rotate in one direction during the thread-cutting relative movement between the tap and the work and to rotate in the reverse direction during tap-withdrawing relative movement between the tap and work.

7. In a tapping machine, a driving shaft; a tap spindle; a work support; means for producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter including a gear train, an oscillatory arm having a fixed pivot point, a crank pin driven by the driving shaft adapted to operate the oscillating arm, and a rack carried by the arm and engaging said gear train for causing the tap spindle to rotate at one angular speed and in one direction during thread-cutting relative movement between the tap and work and arranged so that the crank pin operates the oscillating arm closer to the fixed pivot during tap-withdrawing movement of the tap spindle to thereby cause the spindle to rotate at another and greater angular speed and in the reverse direction during tap-withdrawing relative movement between the tap and work.

8. In a tapping machine, a driving shaft; a tap spindle; a work support; means for producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter and including a crank pin in continuous driving connection with said means for producing relative movement between the tap spindle and the work support for coordinate operation, an oscillatory arm having a slot engaged by said crank pin, and a rack operated by said arm and geared to the spindle for causing the tap spindle to rotate in one direction during thread-cutting relative movement between the tap and the work and to rotate in the reverse direction during tap-withdrawing relative movement between the tap and the work.

9. In a tapping machine, a frame, a driving shaft; a tap spindle; a work support; means for producing relative movement between the tap spindle and work support toward and from each other to cause the work carried by the latter to be entered by a tap carried by the spindle to cut threads in the work, and to cause the tap to be withdrawn from the work, respectively; and driving connections between the driving shaft and tap spindle for rotating the latter and including a crank pin in continuous driving connection with said means for producing relative movement between the tap spindle and the work support for coordinate operation, an oscillatory arm having a fixed pivot connection on the main frame and a slot engaged by said crank pin and a rack having a connection with the outer end of the arm and operated by said arm and geared to the spindle for causing the tap spindle to rotate in one direction during thread-cutting relative movement between the tap and the work and to rotate in the reverse direction during tap-withdrawing relative movement between the tap and the work, said crank pin and oscillatory arm being so arranged relatively that the crank pin is closer to the fixed pivot during tap-withdrawing movement to effect a greater angular speed in tap-withdrawing direction than in thread-cutting direction.

10. In a tapping machine the combination of a base; a driving shaft; a tap spindle; means for effecting multidirectional rotation of the tap spindle including a gear train having a main driven gear, an oscillating arm having a pivotal connection to the base, a rack pivotally connected to said oscillating arm and cooperating with said main driven gear; and means for maintaining said rack in predetermined operating position axially relative to the driven gear irrespective of its changing angular and longitudinal position with respect thereto.

11. In a tapping machine the combination of a driving shaft; a tap spindle; means for effecting multidirectional rotation of the tap spindle including a gear train having a main driven gear, a shaft for said main driven gear, an oscillating arm, a rack pivotally connected to said oscillating arm and cooperating with said main driven gear; and means comprising a carriage rotatably mounted on said gear shaft and a plurality of rollers carried thereby for maintaining said rack in predetermined operating position axially relative to the driven gear irrespective of its changing angular and longitudinal position with respect thereto.

MARTIN J. DANIELSON.
FERDINAND LINDGREN.